June 11, 1946. W. H. J. BROCK 2,401,856
RETAINING WASHER AND THE LIKE
Filed May 9, 1944
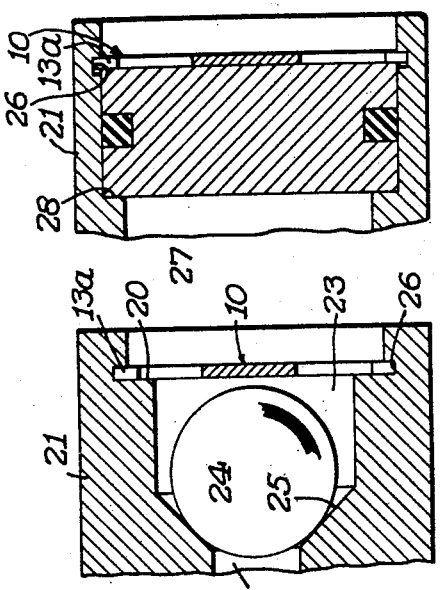
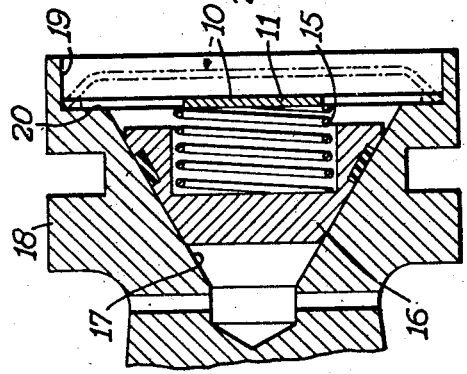
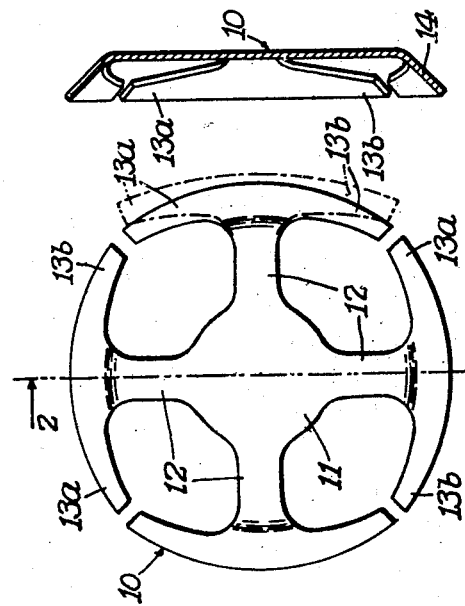
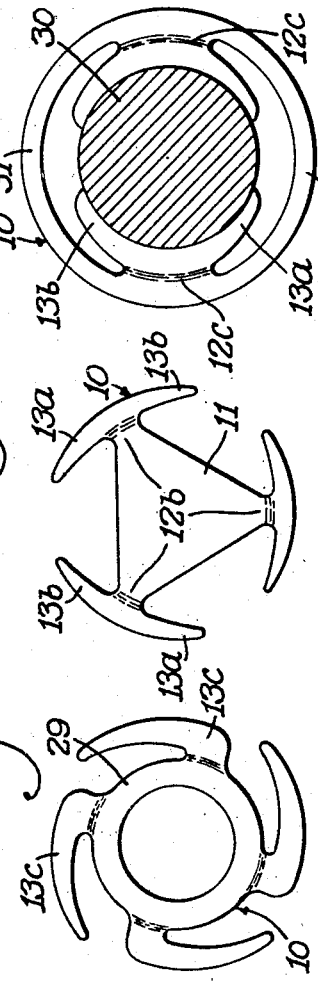
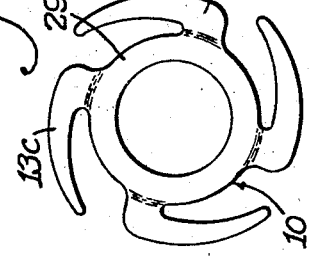
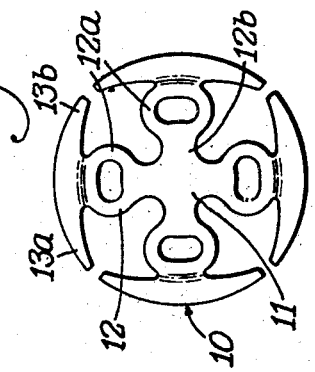
Inventor
William Hudson James Brock
by Stevens and Davis
his attorney Patented June 11, 1946

2,401,856

UNITED STATES PATENT OFFICE 2,401,856

RETAINING WASHER AND THE LIKE

William Hudson James Brock, Leamington Spa, England, assignor of one-half to Automotive Products Company Limited, Leamington Spa, England Application May 9, 1944, Serial No. 534,758
In Great Britain May 6, 1943

5 Claims. (Cl. 220—55)

This invention relates to retaining washers and the like of the kind (hereinafter mentioned as the kind referred to) comprising a washer or disc which, in its initial form, is distorted so that its outer or inner marginal part, at least, assumes a frusto-conical or other dished shape; the dimensions are then such as to allow the retaining member to be passed into position within or upon a tube or like member, whereupon the retaining member is flattened by a suitable pressing device, thus causing it to spread radially into gripping engagement with the tube or equivalent member.

It is the primary object of the present invention to provide an improved form of retaining means which is found to be efficient and convenient to install. A further object of the invention is to provide a form of retaining means which compensates for variations, within limits, in the size of the tube or equivalent member.

In a retaining member of the kind referred to, according to the invention that edge which is arranged to be brought into engagement with the tube or equivalent member is divided into a plurality of sections, each including a limb extending circumferentially so that the side of the limb bears resiliently against the tube or equivalent when the retaining member is flattened.

There is further provided according to the invention a retaining member of the kind referred to, which is formed around its periphery with a plurality of cantilever limbs directed circumferentially so as to bear resiliently against the tube or equivalent member when the retaining member is flattened.

Preferably the arms extend circumferentially from the extremities of substantially radial spoke portions, each spoke portion, if desired, having a pair of oppositely directed limbs so that the whole forms a substantially T-shaped projection. Moreover the spoke portions may be shaped so as to have substantial elasticity in a radial direction, this effect in one arrangement being produced by stamping each spoke portion in the shape of an eye, opposite sides of which are connected respectively with the corresponding limb or limbs and with the other spoke portion or portions. If desired all the limbs may be arranged to point circumferentially in the same direction, and in one design of retaining member the spoke portions are constituted by the angles of a triangular plate forming the centre part of said member.

In utilising the improved retaining means the limbs may be arranged to engage with a substantially parallel-sided cylindrical surface upon the tube or equivalent, the resilient frictional grip of the limbs, upon said surface, serving to hold the retaining member in position; the retaining member can be arranged to bear against a radial shoulder formed adjacent said cylindrical surface, said shoulder thus serving as a stop for the retaining member. Alternatively the limbs of the retaining member can be caused to engage within a circumferential groove formed in the tube or equivalent.

The invention is illustrated by way of example in the accompanying drawing, in which:

Figure 1 is an end elevation of one form of retaining member in its initial dished condition;

Figure 2 is a sectional elevation on the line 2—2 of Figure 1;

Figure 3 is a sectional elevation of a piston having a valve incorporating the improved retaining means;

Figures 4 and 5 are similar views showing other uses for the invention; and

Figures 6 to 9 show in end elevation four modified forms of retaining member.

The retaining member shown in Figures 1 and 2 is preferably stamped in sheet metal, such as steel, which has a substantial amount of springiness but which is nevertheless capable of being permanently flattened when it is subjected to a pressing operation, as will be hereinafter described. The retaining member, which is indicated generally at 10, comprises a central body portion 11, from which extend four radial spoke portions 12, each terminating in a pair of limbs 13a and 13b. These limbs act in the manner of cantilevers, for they are attached at only one end to the corresponding spoke portion 12, said limbs extending circumferentially so as to make the retaining member 10 substantially circular in shape. It will be seen in Figure 1 that in each case the spoke portion 12 and the two limbs 13a and 13b together form a somewhat T-shaped projection upon the central portion 11. The retaining member 10 is, of course, stamped from sheet metal, the original shape of the limbs 13a and 13b being indicated in broken lines on the right-hand side of Figure 1. When manufactured the retaining member 10 has its outside marginal part, i. e. the limbs 13a and 13b, distorted so that it assumes a substantially frusto-conical shape, as indicated at 14 in Figure 2. This, of course, causes the effective diameter of the retaining member to be temporarily reduced and thus enables it to be slid into position within the apparatus or mechanism for which it is intended.

Thus, as seen in Figure 3, the improved retaining means is used as an abutment for a coiled compression spring 15 serving to hold a frusto-conical valve 16 resiliently upon its seating 17 within a piston 18. The piston 18 is formed with a smooth cylindrical recess 19 having a radial shoulder 20. When the valve member 16 and the spring 15 are assembled, a retaining disc 10, in its initial dished form, is slid into position against the shoulder 20, against which latter it is flattened by a suitable press or punch so that it assumes the position shown in full lines in Figure 3. The flattening has the effect of spreading outwards the limbs 13a and 13b so that the extremities of these limbs bear firmly but resiliently against the internal surface of the recess 19. It will, of course, be appreciated that this effect is in part brought about by the fact that, prior to the dishing of the retaining member, the outer surface of the limbs 13a and 13b was curved to a radius substantially larger than the radius of the recess 19. As a result the retaining member 10 secures an efficient eight-point support within the recess 19, and it is found that for many applications sufficient grip is secured without the necessity of specially grooving the recess for the retaining member 10.

It may be desirable in some cases, however, to obtain a positive locking effect, and two such instances are shown in Figures 4 and 5 respectively. In Figure 4 a member 21 has an axial passage 22, which latter is enlarged to form a chamber 23 for a ball valve 24, the seating being indicated at 25. In order to retain the ball 24 within the chamber 23 a retaining member 10 of the improved form is provided and is flattened against a shoulder 20 so that its limbs 13a and 13b enter and resiliently engage within a circumferential groove 26 formed in the member 21 adjacent the shoulder 20. A similar arrangement is shown in Figure 5, but the retaining member 10 in this instance is used for supporting a closure plug 27 against a shoulder 28 formed within the tube or equivalent member 21. In this instance the retaining member 10 is flattened against the plug 27 by a suitable punch or press (not shown), thus causing the limbs 13a and 13b to expand into resilient engagement with a groove 26 formed in the member 21.

It will be realised that the retaining member may take various forms. Thus with the design shown in Figure 6 substantially the whole, or at least a large part, of the resilience for the limbs 13a and 13b is provided by the corresponding spoke portions 12, which latter are shaped in the form of eyes, indicated at 12a. The limbs 13a and 13b, together constituting a somewhat segmental strip, are connected with one side of the corresponding eye, while the opposite side is connected by a neck 12b with the central portion 11 of the retaining member. The marginal part of the retaining member is initially of frusto-conical shape and is therefore reduced in diameter so as to enable said member to be passed into position; upon flattening, the limbs 13a and 13b press firmly against the surrounding tube or equivalent (such as the recess 19, Figure 3), and thus cause the corresponding eyes 12a to be squeezed in radially. Obviously a somewhat similar effect might be obtained by corrugating the spoke portions 12, but the arrangement illustrated has the advantage that the spoke portions are at all times quite flat. The spoke portions might, however, be made sinuous, as seen in end elevation, with the same object in view.

Another form of retaining member is shown in Figure 7 and comprises an annular central portion 29 formed with integral arcuate limbs 13c. These all point in the same circumferential direction. When the retaining member is flattened these limbs 13c all bear resiliently outwards with a cantilever action and thus lock the retaining member 10 in position within the tube of equivalent member.

The retaining member shown in Figure 8 has a triangular centre portion 11, the angles 12b of which constitute spoke members supporting three pairs of limbs 13a, 13b. These limbs are in the form of arcuate strips, which are brought into intimate engagement with the tube or equivalent when the retaining member 10 is flattened.

A retaining member suitable for use upon the outside of a rod, tube or equivalent constructional element is shown in Figure 9, said element being indicated in section at 30. The retaining member 10 comprises an outer ring 31 shaped with inwardly directed spoke portions 12c, each carrying a pair of curved limbs 13a, 13b. These limbs constitute the internal margin of the retaining member 10, and when the latter is manufactured this internal margin is pressed to a frusto-conical or dished shape, thus increasing the effective diameter of the space between the limbs 13a, 13b. This enables retaining device 10 to be readily passed into position upon the rod or equivalent 30. The retaining member 10 is then flattened by a suitable hollow punch or press, thus causing the limbs 13a, 13b to be pressed inwards into engagement with the rod or equivalent 30. In this instance the resilient engagement of the limbs 13a, 13b is to a large measure secured by the narrow form of the outer ring 31, which functions as a body portion and virtually constitutes a pair of resilient curved ties joining the spoke portions 12c.

It will be obvious that there are many applications of the invention other than those described above, and that various modifications may be made to suit requirements. Thus the improved washers may be of substantially square or other non-circular shape, especially where they are required for installation in tubes or cavities which are themselves of non-circular cross-section.

One of the principal advantages of the invention lies in the fact that it is not necessary to hold the parts within close limits in order to obtain a satisfactory result, as was the case with the so-called "Welsh washers" hitherto employed. So long as the resilient part of the retaining member is stressed to some extent the washer will be held firmly in position, especially when a groove for the reception of the limbs is provided.

A retaining member located in the manner described above may be subsequently secured in position by brazing, soldering or welding.

What I claim is:

1. A retaining member comprising, a flat body portion, spokes extending radially from said body portion, and a limb portion extending circumferentially from the extremity of each of said spokes, said member being dished in an annular zone intersecting the extremities of said spokes and said limb portions being shaped to define a substantially conical surface so that the retaining member as a whole is frusto conical in shape, whereby upon flattening of the member the free ends of the limbs have a greater radial dimension than that of the member taken along the spokes.

2. A retaining member as claimed in claim 1 wherein the limb portions extend circumferentially in opposite directions from the extremities of the respective spokes so that each spoke and the respective limb portion define a substantially T-shaped projection.

3. A retaining member as claimed in claim 1 wherein each of the spokes defines an eye at a point adjacent the respective limb portion, whereby the resilience of the spoke is improved without interference with resilient deflection of the limb.

4. A retaining member as claimed in claim 1 wherein the limb portions extend circumferentially in one direction only from the extremity of the respective spokes.

5. A retaining member as claimed in claim 1 wherein the body portion is triangular and the spokes extend from the apices of the triangular body.

WILLIAM HUDSON JAMES BROCK.